(No Model.) 2 Sheets—Sheet 1.

J. F. GLEASON.
DEVICE FOR FILLING JOINTS OF METAL PIPE.

No. 519,672. Patented May 8, 1894.

WITNESSES
Frank G. Parker
H. W. Lakin

INVENTOR
Jedediah F. Gleason
By Wilber H. Lakin
Attorney (No Model.) 2 Sheets—Sheet 2.

J. F. GLEASON.
DEVICE FOR FILLING JOINTS OF METAL PIPE.

No. 519,672. Patented May 8, 1894.

WITNESSES
Frank G. Parker.
H. W. Lakin

INVENTOR
Jedediah F. Gleason
By Wilber F. Lakin
Attorney

UNITED STATES PATENT OFFICE.

JEDEDIAH F. GLEASON, OF QUINCY, MASSACHUSETTS.

DEVICE FOR FILLING JOINTS OF METAL PIPE.

SPECIFICATION forming part of Letters Patent No. 519,672, dated May 8, 1894.

Application filed December 28, 1893. Serial No. 495,019. (No model.)

*To all whom it may concern:*

Be it known that I, JEDEDIAH F. GLEASON, a citizen of the United States, residing at Quincy, in the county of Norfolk and Commonwealth of Massachusetts, have invented a new and useful Device for Filling Joints of Metal Pipe when Made with Bell and Spigot, of which the following is a specification.

My invention relates to improvements in a device for filling or sealing metal pipe joints, and the particular object of the invention is not only to provide means whereby the joints of metal pipe, when made with bell and spigot to be packed or sealed with molten lead, or other metal, may be filled, and the filling confined in proper place until it is solidified, but also to provide means whereby, at the same time and by a single operation, to form a gate or dam to the pour-hole, for quickly and conveniently pouring the joint. Previous to my invention it has been customary, so far as I am aware, in filling a joint of the kind described, to use a roll made of tempered clay or other plastic material, either wholly, or in part, to form a gate or dam to the pour-hole, either of which methods consumes time and is open to other objections.

The invention consists of devices and combinations of devices hereinafter fully described and specifically claimed.

Figure 1:
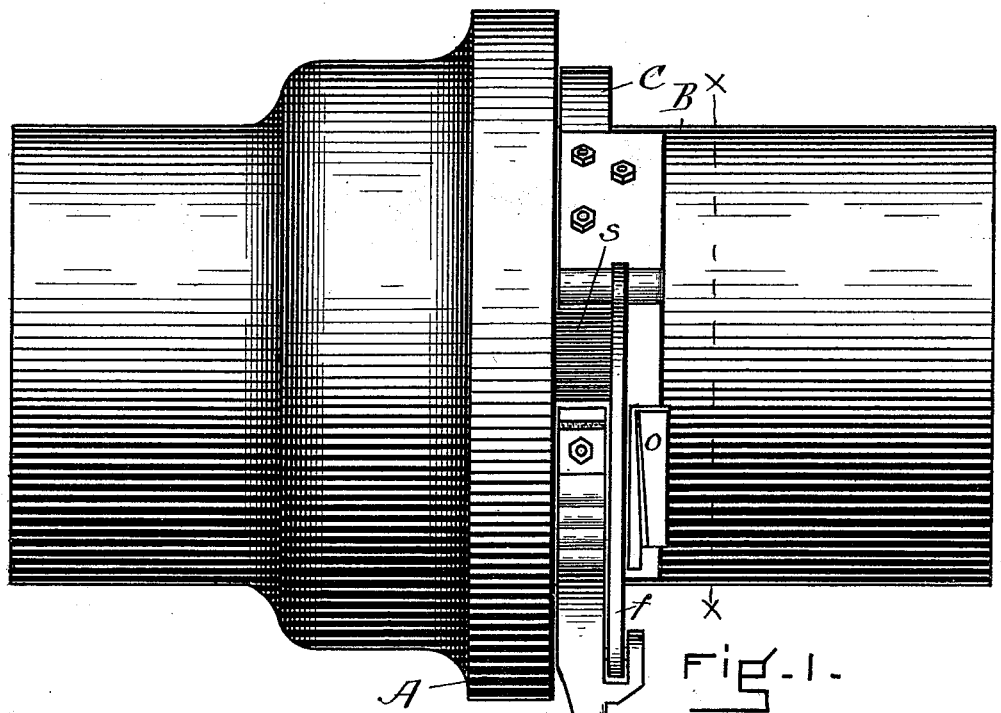
Figure 2:
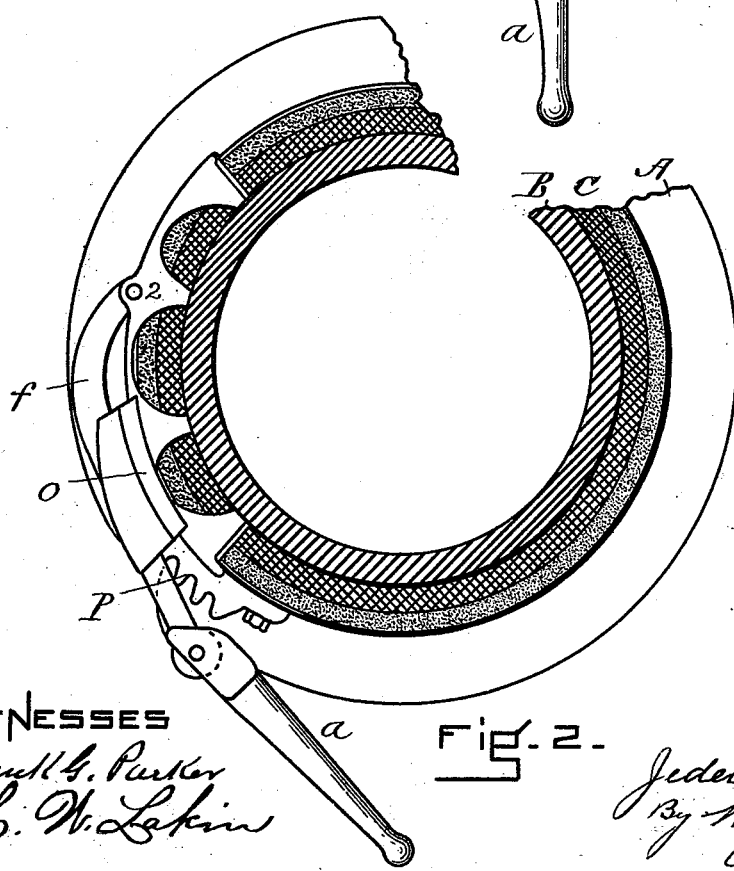
Figure 3:
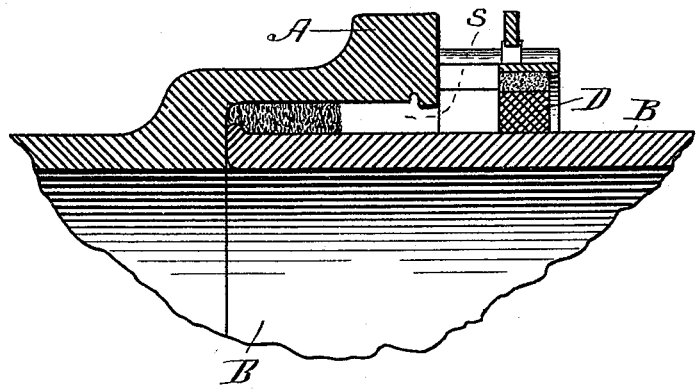
Figure 4:
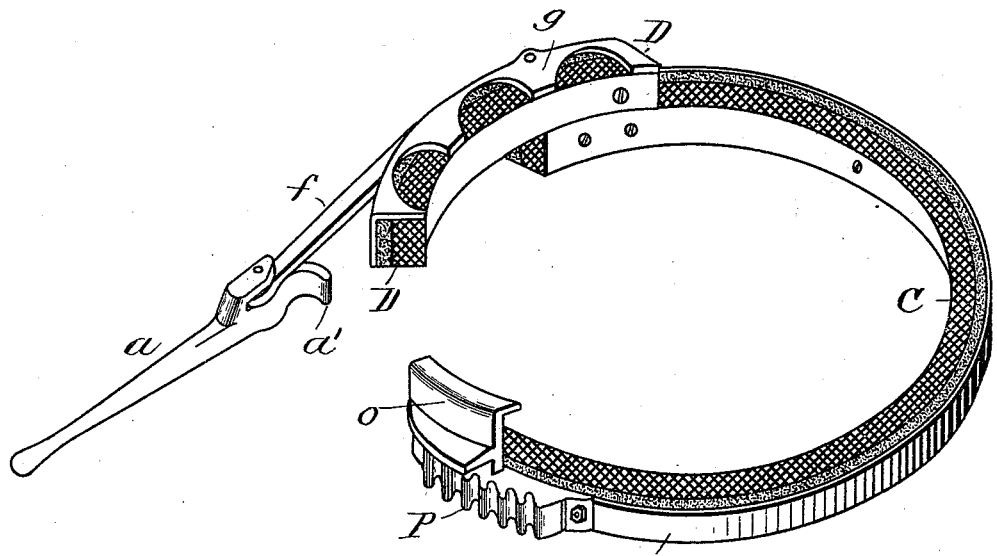

In the accompanying drawings, Figure 1 represents a top view; Fig. 2 a view in cross section on dotted line $x, x$. Fig. 3 is a detail view in section showing the dam or gate and pour-hole. Fig. 4 is a view in perspective showing my improved device when open.

Similar letters of reference indicate like parts in all the figures of the drawings.

In the drawings A is the bell end of a pipe. B is the spigot end of a pipe. C is a gasket which may be composed of rubber, hemp, or any suitable pliable elastic material which is preferably reinforced by metallic bands $m$ riveted, bolted or otherwise properly secured thereto, said gasket C being a little less in circumference than the spigot end of the pipe to be sealed.

D is a short section of gasket or band composed of the same or similar material as C and is properly secured upon the side and one end of the gasket C and forms, when brought into position for use, a dam or gate to the pour-hole S, as is shown in Figs. 1 and 3.

P is a metal rack properly secured to one end of the gasket C having a flanged portion $o$ adapted to guide and retain in position the short section of gasket D. Said rack P is provided with a series of teeth (as is more plainly shown in Fig. 4) to enable, when they are engaged by the pawl $a'$ of the handle-lever $a$, a strong tension to be placed upon the gasket, thus firmly compressing the same around the end of the pipe to be filled or sealed when there are variations in the size of pipe to be used, or in other words, to allow for and conform to the variations in the size of pipe used.

$f$ is a bent or curved arm of a compound lever which is hinged at one end to the gasket C and the short section D, and at the other end to the handle-lever $a$, said handle lever $a$ being provided with a pawl $a'$ adapted to engage with the rack P, thus putting a strong tension upon the gasket and firmly compressing the same around the spigot end and close against the bell end of the pipe to be filled.

In the foregoing description of my improved joint filling device, I have explained that the ring or gasket C and the shorter section D were composed of some flexible, elastic material, and I prefer such construction as productive of better results, but it is evident that both of these may be composed of a non-flexible and non-elastic material by being suitably hinged to admit of opening and closing, without departing from the spirit of my invention.

Having thus described my invention, its operation will readily be understood by those skilled in the art.

I claim as my invention—

1. In a filling or sealing device for pipe joints, in combination, a flexible band or gasket of less circumference than the pipe upon which it is to be used, a clamping mechanism substantially of the kind described adapted to draw together the ends of said gasket, and a pour-hole section adapted to overlap the ends of said gasket, all as set forth.

2. In a pipe filling or sealing device for pipe joints, in combination, a band or gasket of any suitable material of less circumference than the pipe upon which it is to be used and adapted to clasp said pipe, a shorter section of band or gasket of sufficient length and adapted to overlap or close the ends of said gasket to form a pour-hole and a clamping mechanism, substantially as described.

In testimony whereof I have hereunto subscribed my name this 15th day of December, 1893.

JEDEDIAH F. GLEASON.

Witnesses:
WALTER M. PACKARD,
JOHN McKNIGHT.